United States Patent [19]
Comparetto

[11] 4,313,241
[45] Feb. 2, 1982

[54] METHOD FOR OPENING SHELLFISH

[76] Inventor: John E. Comparetto, 3306 Glen Carlyn Rd., Falls Church, Va. 22041

[21] Appl. No.: 955,549

[22] Filed: Oct. 27, 1978

[51] Int. Cl.³ .................................... A22C 29/04
[52] U.S. Cl. ................................. 17/48; 17/74
[58] Field of Search ........... 17/48, 74, 51; 220/211, 220/230

[56] References Cited
U.S. PATENT DOCUMENTS

| | | | |
|---|---|---|---|
| 2,530,783 | 11/1950 | Pogany | 17/48 |
| 2,978,334 | 4/1961 | Lapeyre | 17/48 X |
| 3,456,836 | 7/1969 | Erickson et al. | 220/211 |
| 3,471,894 | 10/1969 | Tasker | 17/48 |
| 3,487,421 | 12/1969 | Ruppel et al. | 53/525 X |
| 4,030,322 | 6/1977 | Pettit | 220/211 X |
| 4,124,920 | 11/1978 | Wenstrom et al. | 17/48 |

*Primary Examiner*—Willie G. Abercrombie
*Attorney, Agent, or Firm*—James C. Wray

[57] ABSTRACT

Shellfish are placed into a chamber which is brought rapidly to a high pressure. A lid of the chamber is magnetically sealed. The magnets are quickly released to allow the chamber pressure to blow off the cover with large springs absorbing energy. The immediate decompression tends to open the shells. A sonic or ultrasonic source within the chamber augments the process.

8 Claims, 2 Drawing Figures

METHOD FOR OPENING SHELLFISH

BACKGROUND OF THE INVENTION

The present methods of opening shellfish are numerous. Most successful has been flash heating with steam or flame, which subjects shellfish momentarily to heat. Each shellfish has a critical temperature range within which the creature dies and releases its shell. More recently, combinations of steam and pressure have been used so that lower temperatures could possibly be used. Other methods include manual shucking, methods for fracturing the shell, and chemical solutions into which the shells are placed. All the above have inherent drawbacks too numerous and varied to comment on.

OBJECTS OF THE INVENTION

An object of the invention is to open the shell without grossly fracturing the shell and macerating its content.

A further object of the invention is to open the shell without bleeding of the juices inherent in the flash methods.

A further object of the invention is to do the above in an unlimited quantity depending on the size of the device.

A further object of the invention is to do same with a heterogenous group of shells as to shell size.

A further object of the invention is to provide a less expensive system than the highly complicated machinery now in use.

A further object of the invention is to use an ultrasonic transducer to facilitate opening and/or the passage of surrounding medium into the shellfish.

A further object of the invention is to provide a vibrator for facilitating opening and/or the passage of the surrounding medium into the shellfish.

A still further object of the invention is to have a hyperbaric chamber capable of using gases such as nitrogen to enhance the animals release from the shell.

DETAILED DESCRIPTION OF THE INVENTION

Figure 1:
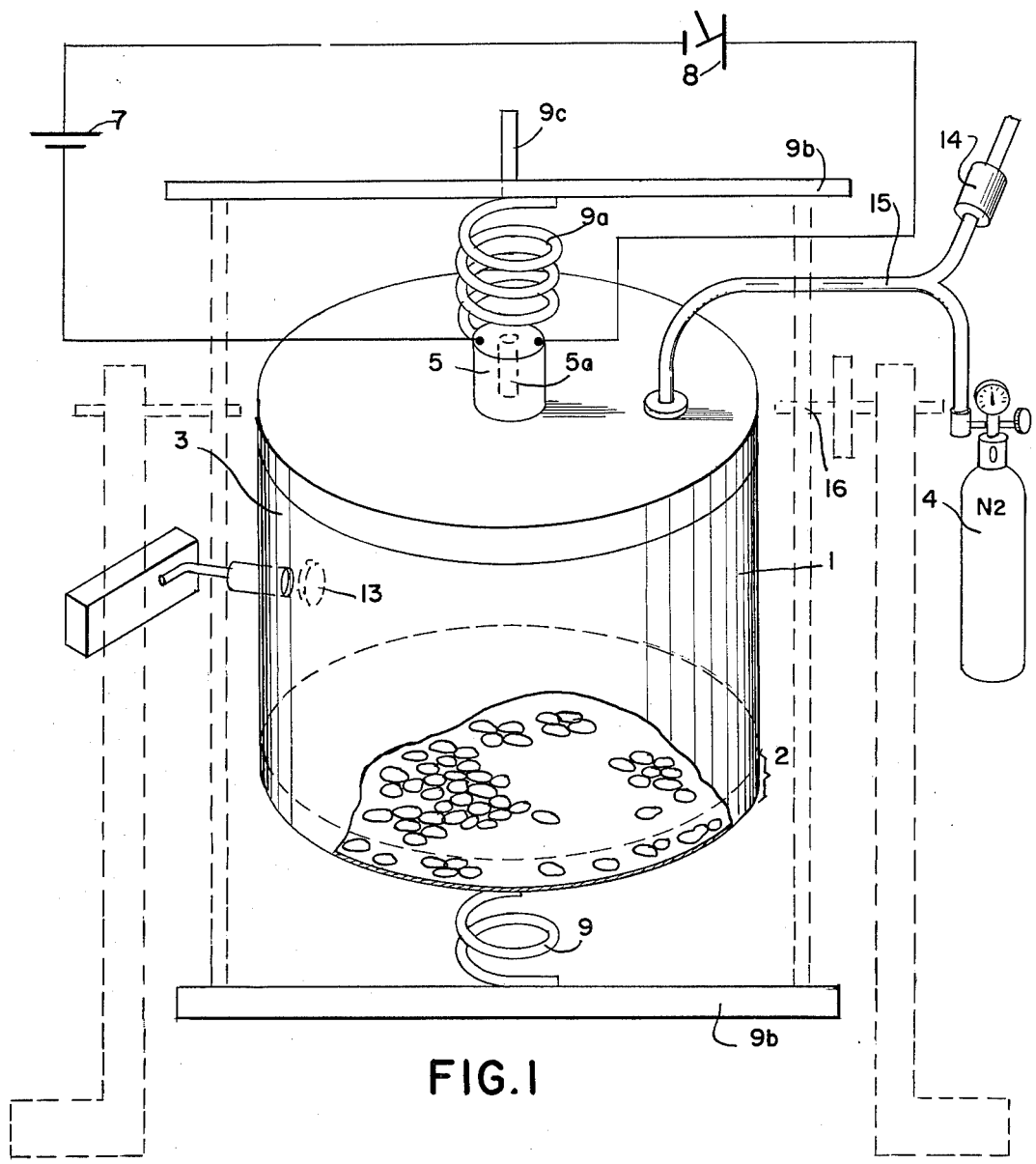
FIG. 1 shows a schematic view of the invention.
Figure 2:
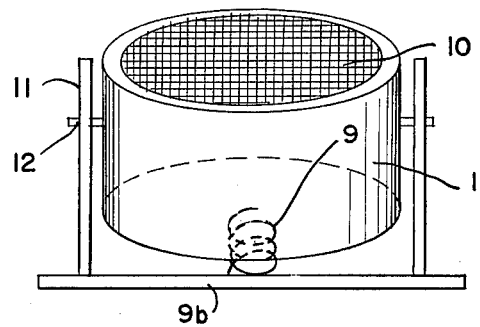
FIG. 2 shows a schematic detail of the chamber, screen shield, and guide arms.

FIG. 1 shows a chamber 1 made of stainless steel or other suitable material into which shellfish, for example, oysters 2 are placed. FIG. 1, 3 shows area of chamber into which gas under high pressure is introduced by pump or high pressure gas source 4. Electromagnet or permanent release magnet 5; magnetic core 5A attached to bottom sealing plate which is the magnetized lid of chamber 1. Current source 7, completed by switch 8. FIG. 1, 9 shows a heavy duty spring for the downward recoil of the chamber. FIG. 1, 9A shows a heavy duty spring attached with adjustable sleeve or bracket 9C to allow for lid opening. The heavy duty spring is to allow for the upward recoiling of the magnetized lid. Framework 9B comprises heavy structured steel frame to attach springs or other shock absorber 9 and 9A. FIG. 2 shows chamber 1 with screen lid 10. Guide arms 11 supports chamber connections 12. Sonic or ultrasonic head source 13 is mounted within chamber 1.

The process consists of introducing pressure in an enclosed chamber not to exceed the fracture point of the shells but enough to compress the shells a minute amount, for example, 0.001 of an inch. Sudden release of this pressure should tend to open the shells. This sudden release is accomplished by a magnetized lid, most preferrably, magnetized electrically 5. With the release of electromagnet 5 the hyperbaric pressures within the chamber are instantly released. It might be necessary to utilize heavy duty springs 9 and 9A to absorb energy from the sudden release of compressed gas. After sudden releasing, the current could be reapplied to the magnet re-sealing chamber for either a repeat of hyperbaric conditions or evacuation of the gas to form a vacuum over the shells with vacuum pump 14 on feed tubing 15.

While the shells could be placed under water or other liquid within the chamber, the best method might be the utilization of a gas or a liquid that would cause a physiologic change in the animal. This physiological reaction would be predicated on the permeation of the gas through the seams of the shell.

The gas or liquid should not poison the meat. A gas of choice might be nitrogen. It is known that the deep sea clam experiences "the bends" when the animal is quickly raised from the depths. Utilizing a hyperbaric chamber as described herein, nitrogen gas can be caused to permeate the seams of the shell and the tissue within. The combination of sudden change of pressure and hyperbaric nitrogen should be an efficient method of opening difficult shells such as the oyster. The process of increasing pressure and then suddenly releasing could be repeated if necessary.

The induction of nitrogen narcosis in shellfish would be subject to variance of time and the amount of pressure.

The permeation of the nitrogen or other surrounding medium could be further enhanced by the generation of sonic waves, ultrasonic waves, or a gross mechanical vibration 13, FIG. 1. Combinations of these energies within a hyperbaric atmosphere might be required; however, this might indeed be an "overkill" that would cause problems such as bleeding as seen in flash methods.

The sudden escaping of gas under pressure would become more violent as pressure is increased, therefore, the limiting parameter would be the too violent sudden escape of gas. Chamber 1 would be affixed with barrier screen 10 to prevent unwanted expulsion of chamber contents. Guide arm 11 would allow for movement to be absorbed by the centrally located springs 9 and 9A affixed to framework 9B. Pivot arm FIG. 1, 16 on one or both sides of vertical frame member 9D allows for dumping of contents.

The gas might be evacuated rapidly from a valve with sufficient speed to cause nitrogen narcosis after hyperbaric levels had been attained. The device should allow for the subjection of the freshly opened shells to liquid nitrogen for freezing. The product could now be packaged for selling with opened shell included, however, this might prove an unwanted weight factor in shipping.

What is claimed is:

1. The process of opening shellfish comprising placing shellfish in a chamber, closing the chamber, holding the chamber closed with a magnet, passing energy waves through the fluid surrounding the shellfish in the chamber inducing hyperbaric pressures over shellfish, slightly compressing the shellfish, then suddenly releasing the magnet and decreasing pressure to ambient values or to negative values.

2. The process of claim 1 further comprising reapplying hyperbaric pressures over the shellfish and again suddenly decreasing pressure.

3. The process of claim 1 further comprising inducing narcosis in the shellfish by hyperbaric permeation of shellfish.

4. The process of claim 1 further comprising passing ultrasound through gas or liquid surrounding the shellfish.

5. The process of claim 1 further comprising passing of sound waves through gas or liquid surrounding the shellfish.

6. The process of claim 1 further comprising passing gross mechanical vibration through liquid or gas surrounding the shellfish.

7. The process of claim 1 further comprising a subsequent step of freezing of the shellfish with liquid nitrogen.

8. The process of claim 1 wherein the inducing pressure comprises the steps of introducing nitrogen to the chamber to increase pressure within the chamber and to induce nitrogen narcosis to living animals within the chamber.

* * * * *